US008047326B2

(12) United States Patent
Valleroy et al.

(10) Patent No.: US 8,047,326 B2

(45) Date of Patent: Nov. 1, 2011

(54) METHOD FOR MAKING AN ACOUSTIC ABSORPTION PANEL IN PARTICULAR FOR THE NACELLE OF AN AIRCRAFT ENGINE

(75) Inventors: Laurent Georges Valleroy, Le Havre (FR); Florent Bouillon, Anglesqueville (FR)

(73) Assignee: Aircelle (FR)

( * ) Notice: Subject to any disclaimer, the term of this patent is extended or adjusted under 35 U.S.C. 154(b) by 0 days.

(21) Appl. No.: 12/528,845

(22) PCT Filed: Feb. 6, 2008

(86) PCT No.: PCT/FR2008/000141

§ 371 (c)(1), (2), (4) Date: Aug. 27, 2009

(87) PCT Pub. No.: WO2008/113904

PCT Pub. Date: Sep. 25, 2008

(65) Prior Publication Data

US 2010/0108435 A1 May 6, 2010

(30) Foreign Application Priority Data

Feb. 28, 2007 (FR) ..................................... 07 01418

(51) Int. Cl.
*B64D 33/02* (2006.01)

(52) U.S. Cl. .......... 181/214; 181/210; 181/292; 244/1 N

(58) Field of Classification Search .................. 181/210, 181/214, 292; 244/1 N
See application file for complete search history.

(56) References Cited

U.S. PATENT DOCUMENTS

| | | | | |
|---|---|---|---|---|
| 3,910,374 | A * | 10/1975 | Holehouse | 181/292 |
| 5,270,095 | A * | 12/1993 | Ito et al. | 428/116 |
| 7,541,082 | B2 * | 6/2009 | Yu | 428/116 |
| 2008/0047121 | A1 * | 2/2008 | Douglas | 29/402.01 |

FOREIGN PATENT DOCUMENTS

| | | |
|---|---|---|
| EP | 0798107 | 10/1997 |
| EP | 1621752 | 2/2006 |

OTHER PUBLICATIONS

International Search Report PCT/FR2008/000141; Dated Nov. 11, 2008.

* cited by examiner

*Primary Examiner* — Forrest M Phillips

(74) *Attorney, Agent, or Firm* — Cantor Colburn LLP

(57) ABSTRACT

The invention relates to a method for making an acoustic absorption panel in particular for the nacelle of an aircraft engine, the panel being of the type comprising a cellular core covered on one side with a so-called outer air-permissive skin and on the other side with a so-called inner perforated skin, the cellular core being formed by the edge-to-edge junction of a plurality of blocks with a cellular core (B1, B2). The method comprises the following steps: a) before the edge-to-edge junction of blocks with a cellular core (B1, B2), opening the cells (A1, A2) located on the edges of the blocks to be joined; and b) edge-to-edge dry joining the blocks (B1, B2) so that the open cells (A1, A2) engage into one another.

7 Claims, 1 Drawing Sheet

METHOD FOR MAKING AN ACOUSTIC ABSORPTION PANEL IN PARTICULAR FOR THE NACELLE OF AN AIRCRAFT ENGINE

TECHNICAL FIELD OF THE INVENTION

The present invention relates to the field concerned with reducing the noise emitted by engines, particularly aircraft engines.

BRIEF DESCRIPTION OF THE RELATED ART

A constant preoccupation in the field of the aeronautical industry, dictated particularly by recent legislation, is to reduce the noise emitted by aircraft engines, particularly turbojet engines.

It is known that a significant proportion of this noise is generated in the air intake region of the nacelle in which the engine is housed.

This is because this region houses the engine fan, which generates a great deal of noise drawing in and shearing the air.

It is also known practice for acoustic absorption panels to be positioned on the internal face of the air inlet region of the nacelle, in order to reduce the noise generated in this region.

These panels are typically formed of blocks with a cellular core (a structure commonly known as a "honeycomb" structure), covered on their face known as the external face, that is to say the face radially furthest from the axis of the engine, with an air-impermeable skin and, on their internal face, that is to say the face radially closest to the axis of the engine, with an air-permeable skin.

Such panels constitute acoustic resonators capable of "trapping" the noise and therefore of reducing noise emissions toward the outside of the nacelle.

For reasons that may be connected, for example, with the geometry of the nacelle, or with structural constraints (for example: the need to have several different densities of cellular core), it is often necessary to position a number of blocks with cellular cores end-to-end in order to form the acoustic absorption panels.

When this is the case, the regions where these blocks are joined together need to be treated with especial care if good acoustic absorption efficiency is to be maintained.

A common technique used for joining these blocks together is to coat the adjacent edges of these blocks with an adhesive which on baking converts into a foam, and thus forms a kind of expanded-material connecting strip between these edges.

The advantage with this technique is that it makes it possible to obtain a panel which, from a mechanical standpoint, behaves as if it were formed as a single block.

The disadvantage with this technique is that the connecting strip formed by the baked adhesive locally fills the cells of the blocks and thus reduces the effective acoustic area of the block; in addition, a connecting strip such as this constitutes a break in acoustic impedance which also has an adverse impact on the acoustic effectiveness of the block.

BRIEF SUMMARY OF THE INVENTION

The invention provides a method of manufacturing an acoustic absorption panel, particularly for a nacelle of an aircraft engine, this panel being of the type comprising at least one cellular core covered on one of its faces with an air-impermeable skin known as the outer skin and on the other of its faces with a perforated skin known as the internal skin, this cellular core being formed by the edge-to-edge connection of a plurality of blocks with cellular cores, this method being notable in that it comprises the following steps:

a) prior to joining the blocks with cellular cores edge-to-edge, opening up the cells located at the edges of the blocks intended to be joined, and b) joining these blocks together edge-to-edge dry such that the opened-up cells are imbricated in one another.

From an acoustic standpoint, imbricating dry (that is to say without the use of adhesive) cells that have been previously opened up makes it possible to obtain a panel in which practically all of the cells play a part in attenuating the noise.

In addition, the absence of adhesive makes it possible to eliminate the acoustic impedance barriers observed in the panels of the prior art.

From a mechanical standpoint, it has been possible to observe that, surprisingly, a panel obtained according to the present method offered a mechanical strength substantially comparable with that of the panels of the prior art.

Thus, by virtue of the aforementioned features, the method according to the invention makes it possible to obtain a panel which, while being formed of an assembly of a plurality of blocks, exhibits excellent acoustic absorption homogeneity across its entire bulk and satisfactory mechanical behavior.

According to other optional features of the method according to the invention:

- this method comprises a preliminary step of choosing blocks with cellular cores that are slightly larger in size than the desired final size, and a step c1) in which the imbrication performed in step b) is maintained by placing these blocks under stress: by virtue of these features, it is possible for the edges of these blocks to be kept pressed against one another and thus ultimately to obtain an acoustic panel which exhibits substantially the same mechanical properties as if it were formed as a single block;
- this method comprises step c2) in which the imbrication performed in step b) is maintained using fasteners such as clips or staples: this step, which can be implemented on its own or in addition to the preceding step, makes it possible to achieve a very strong connection between the edges of the two adjacent blocks;
- this method comprises step d) which includes assembling as a superposition sets of blocks that have been joined together in accordance with any one of steps a) to c2): this method can be used to manufacture multi-layer panels needed for certain applications.

The present invention also relates to an element intended to surround an engine, notable in that it is equipped with at least one acoustic absorption panel obtained by a method in accordance with the foregoing: an element such as this allows a particularly effective attenuation of the noise emitted by the engine it surrounds.

The present invention also relates to an aircraft nacelle, notable in that it comprises at least one element in accordance with the foregoing.

Optionally, said element may be situated in the air intake region of said nacelle: a nacelle such as this is more particularly able to attenuate the noise emitted by the engine fan.

BRIEF DESCRIPTION OF THE DRAWINGS

Other features and advantages of the present invention will become apparent in the light of the description which will follow and from examining the attached figures in which.

DETAILED DESCRIPTION OF THE INVENTION

Figure 1:
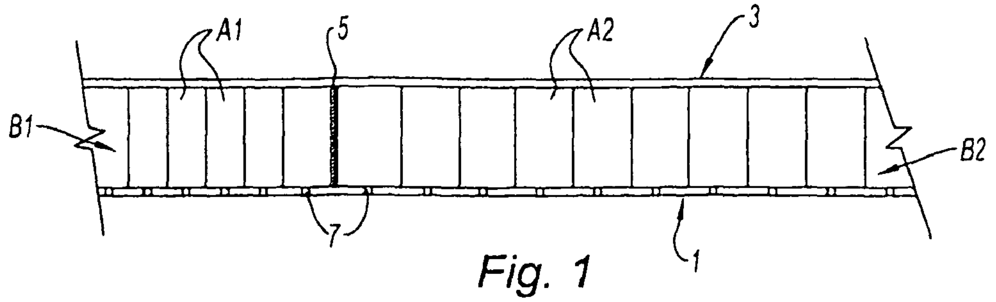
FIG. 1 is a view in cross section of a single-layer acoustic absorption panel according to the present invention.

Reference is now made to FIG. 1 which shows that a single-layer acoustic absorption panel according to the invention typically comprises several, and in this instance two, blocks B1, B2 with cellular cores, sandwiched between a skin known as the internal skin 1 and a skin known as the external skin 3.

These two blocks B1, B2 with cellular cores collaborate with one another in a connecting region 5 the features of which will be detailed hereinafter.

Figure 3:
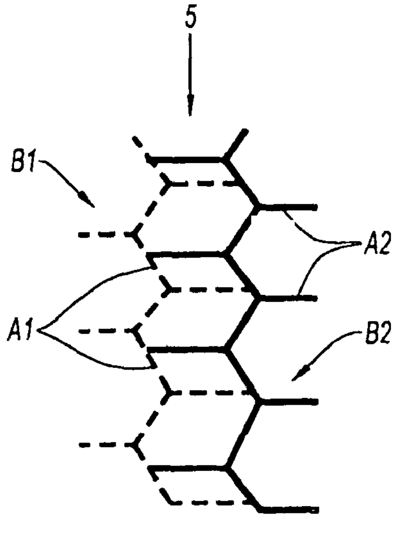
FIG. 3 is a partial schematic view from above of the region of connection of two blocks with cellular cores that form an acoustic absorption panel according to the present invention.
Figure 4:
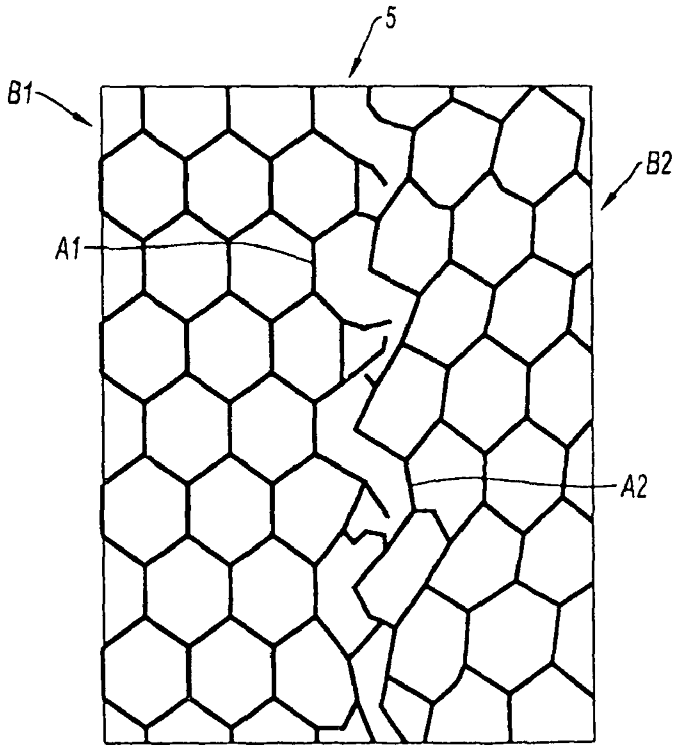
FIG. 4 is an actual view (a photograph) of such a connection region.

As can be seen in FIGS. 3 and 4, the respective cells A1, A2 of the blocks B1, B2 in this instance have hexagonal cross sections thus forming structures known as "honeycomb" structures.

As can be seen in FIG. 1, the cross section of the cells A1 of the block B1 may, for example, be smaller than that of the cells A2 of the block B2, so as to meet acoustic and/or mechanical requirements dictated by the manufacturer's specifications sheet.

The material of which the cells of the blocks B1 and B2 are formed may typically be a light metal alloy suited to the aeronautical field; the material that forms the internal skin 1 may be made of a sheet or of a fabric, and has perforations 7 situated facing the cells A1, A2; the material that makes up the external skin 3 may be a multilayer composite material.

The way in which such an acoustic panel works is known per se: this panel is intended to be mounted in the internal wall of an aircraft nacelle in such a way that the internal skin 1 faces toward the engine housed in this nacelle.

The noise emitted by this engine enters the cells A1, A2 via orifices 7 in the internal skin 1 and vibrates within these cells which constitute acoustic resonators, thus dissipating the acoustic energy and providing a resultant reduction in noise levels.

Figure 2:
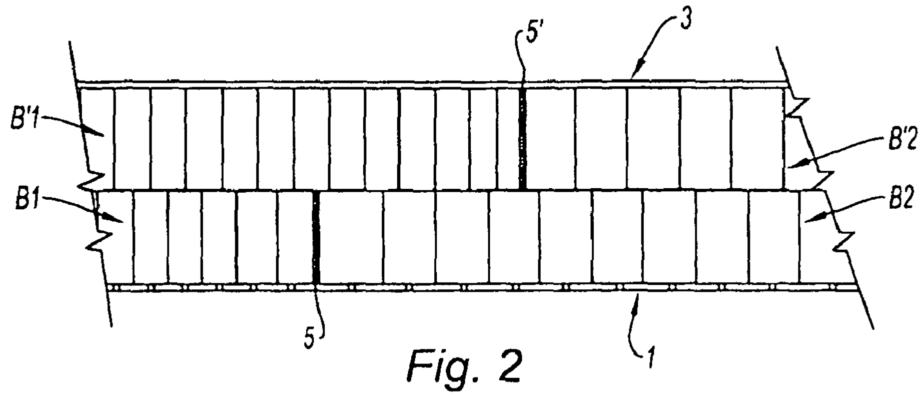
FIG. 2 is a view in cross section of a two-layer acoustic absorption panel according to the present invention.

Reference is now made to FIG. 2 which depicts a two-layer panel according to the invention comprising two layers of blocks with cellular cores, formed respectively of blocks B1, B2 and B1', B2', these layers being joined together by known means and sandwiched between an internal skin 1 and an external skin 3 analogous to those of FIG. 1.

In this two-layer panel, the blocks B1, B2 on the one hand, and B1' and B2' on the other hand, all with cellular cores, collaborate with one another in joining regions 5, 5' respectively, the characteristics of which will now be explained.

To do that, reference is made to FIGS. 3 and 4, which show that, in the region 5 of collaboration of the two blocks B1, B2, the respective cells A1, A2 situated on the adjacent edges of these two blocks have been opened up beforehand, so that they can be imbricated in one another.

In reality, as can be seen in FIG. 4, the imbrication of the cells A1, A2 in one another is not as perfectly geometric as has been depicted in FIG. 3.

It may also prove necessary to touch up these cells prior to imbricating them, particularly if they have become excessively deformed, or are even lying down.

However, this does not in any way affect the advantages of the invention which will now be indicated.

It has been found that imbricating the cells of the edges of the adjacent blocks in one another makes it possible to obtain an acoustic absorption panel the mechanical behavior of which is substantially comparable with that of a conventional panel in which the blocks are bonded together.

In particular, it has been possible to note that the resistance to shear forces of acoustic panels obtained using the method according to the invention was substantially uniform over the entire bulk of these panels, including in the regions of connection of blocks with cellular cores.

Such uniformity of strength is essential because it makes it possible to avoid transferring parasitic forces, particularly bending forces, into the external skin 3.

It has been possible to observe that even better mechanical behavior could be obtained by keeping the blocks with cellular cores stressed against one another as that actually improves the mutual imbrication of the edge cells of these blocks.

One way of maintaining stress like this may be to provide blocks of an area slightly larger than that of the spaces into which they have to be positioned and inserting them into these spaces as a slight force fit.

Another way of improving the quality of the connection between these blocks, possibly in addition to the above, may be to provide mechanical means of connecting the cells situated at the edges of these blocks, it being possible for example for such means to comprise clips or staples.

As may be appreciated in the light of the foregoing, imbricating the cells situated at the edges of the blocks is a satisfactory alternative, from a mechanical standpoint, to the glued connection of the prior art.

From an acoustic standpoint, this "dry" jointing technique makes it possible to avoid filling the cells A1, A2 situated in the region 5 of connection of the blocks B1 and B2 with adhesive; these cells therefore remain available to contribute toward attenuating the noise originating from the side of the external skin 1 that is intended to be positioned on the aircraft engine side.

In other words, the absence of adhesive makes it possible to increase the specific acoustic absorption area of the panel.

In addition, the absence of adhesive makes it possible to do away with any acoustic impedance barrier within the panel, again contributing to its absorption effectiveness.

Of course, the present invention is not in any way restricted to the embodiments described hereinabove, which have been provided by way of simple examples.

The invention claimed is:

1. A method of manufacturing an acoustic absorption panel, particularly for a nacelle of an aircraft engine, the panel comprising at least one cellular core covered on one of its faces with an air-impermeable skin known as an outer skin and on the other of its faces with a perforated skin known as an internal skin, this cellular core being formed by edge-to-edge connection of a plurality of blocks with cellular cores, the method comprising:

a) prior to joining the blocks with cellular cores edge-to-edge, opening up the cells located at the edges of the blocks intended to be joined, and b) joining these blocks together edge-to-edge dry such that the opened-up cells are imbricated in one another and remain in an imbricated overlapping state once the panel is formed.

2. The method as claimed in claim 1, wherein it comprises a preliminary step of choosing blocks with cellular cores that are slightly larger in size than a desired final size, and a step c1) in which the imbrication performed in step b) is maintained by placing these blocks under stress.

3. The method as claimed in claim 2, wherein it comprises step c2) in which the imbrication performed in step b) is maintained using fasteners comprising clips or staples.

4. The method as claimed in claim 3, further comprising step d) assembling as a superposition sets of blocks that have been joined together in accordance with any one of steps a) to c2).

5. An element intended to surround an engine, comprising at least one acoustic absorption panel obtained by a method as claimed in claim 1.

6. An aircraft engine nacelle, comprising at least one element as claimed in claim 5.

7. The nacelle as claimed in claim 6, wherein said element is situated in an air intake region of said nacelle.

* * * * *